UNITED STATES PATENT OFFICE.

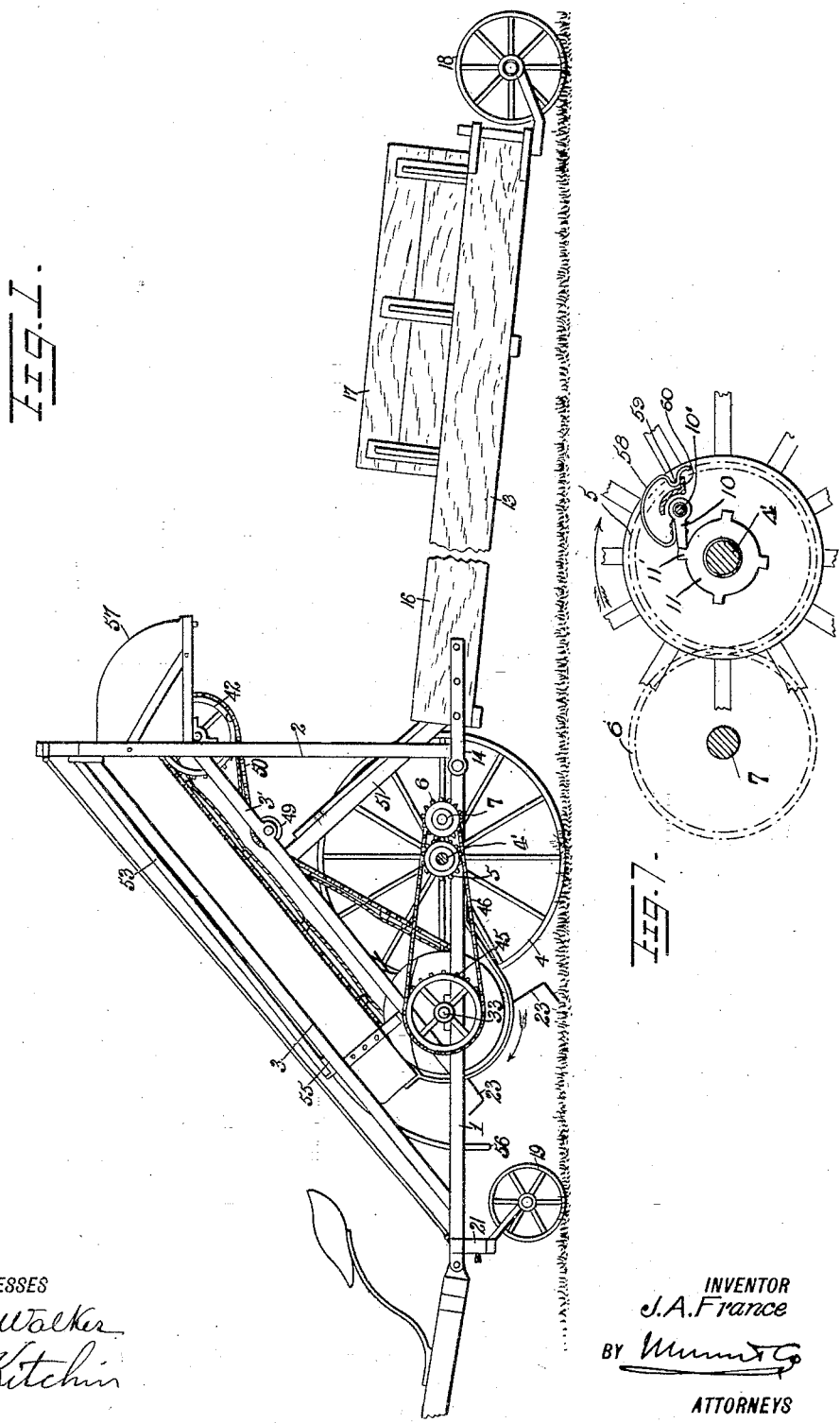

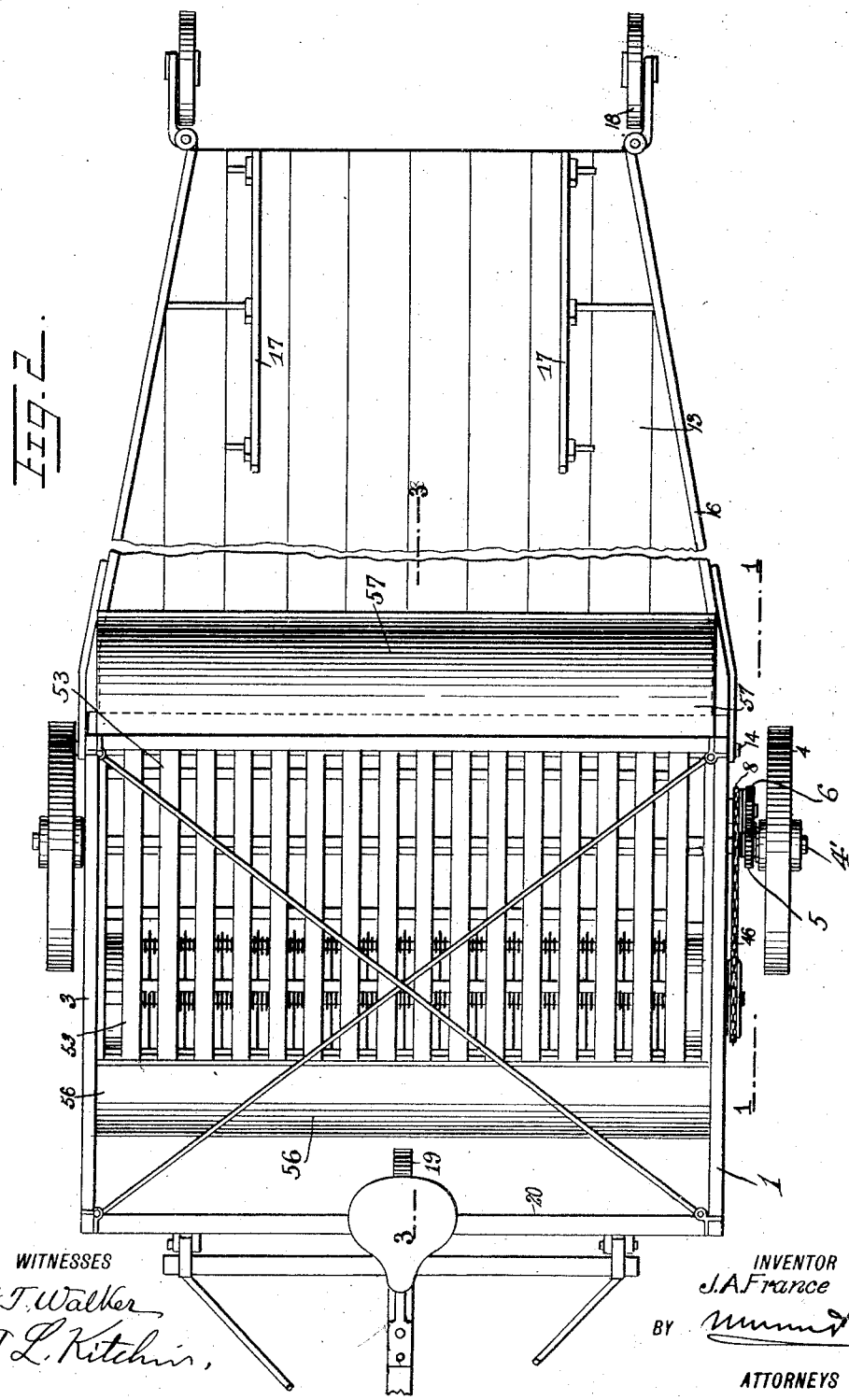

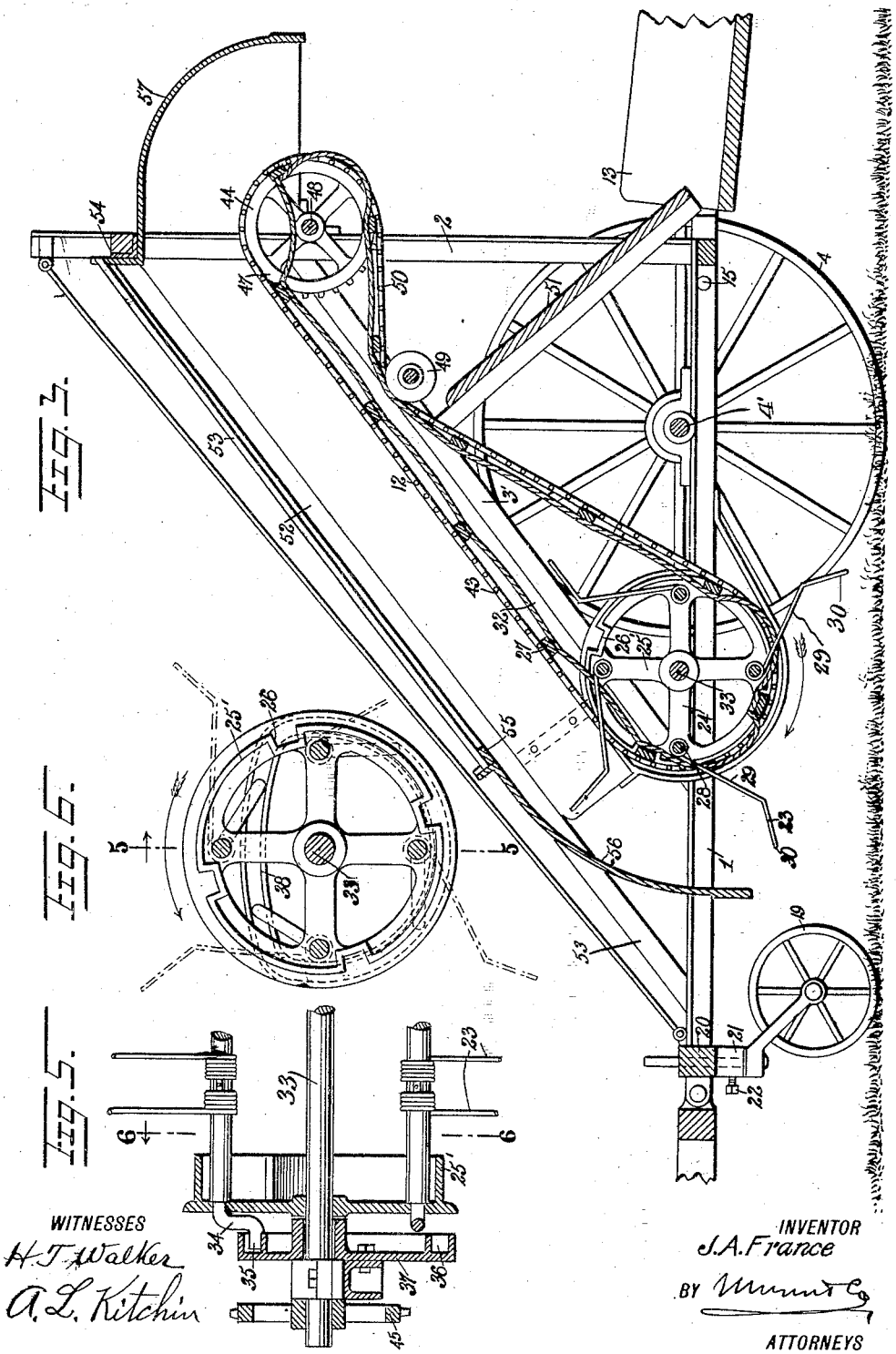

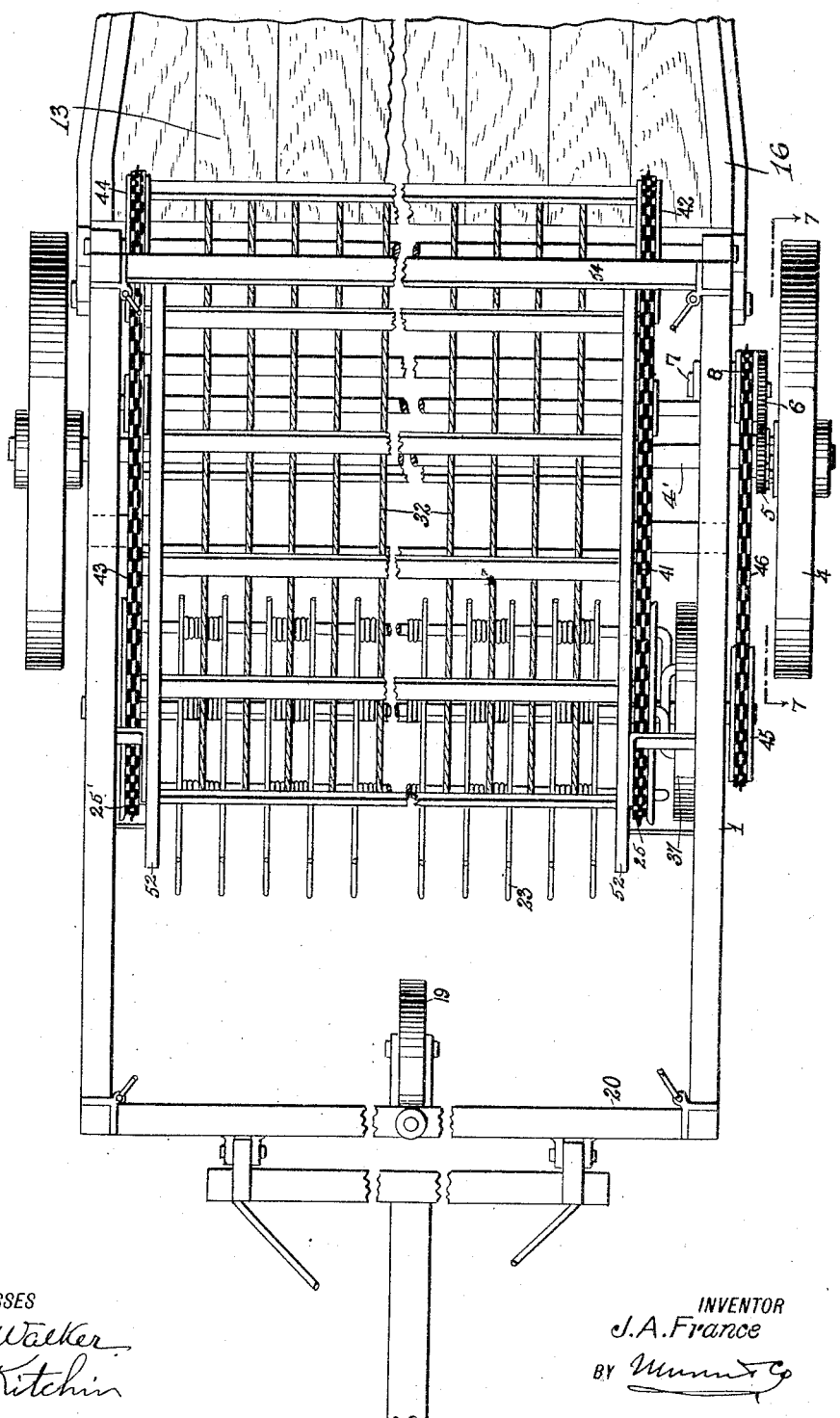

JOHN A. FRANCE, OF SAULT STE. MARIE, MICHIGAN.

HAY-COCKING MACHINE.

1,340,763.  Specification of Letters Patent.  Patented May 18, 1920.

Application filed December 5, 1917. Serial No. 205,568.

*To all whom it may concern:*

Be it known that I, JOHN A. FRANCE, a citizen of the United States, and a resident of Sault Ste. Marie, in the county of Chippewa and State of Michigan, have invented a new and Improved Hay-Cocking Machine, of which the following is a full, clear, and exact description.

This invention relates to machines for gathering and arranging hay or similar crops in piles or cocks, and has for an object the provision of an improved arrangement of hay cocking machines wherein hay is gathered up and deposited on a platform for discharging after having been arranged in a cock of the desired size.

Another object in view is the arrangement of a machine for gathering up hay by a rotary rake member and then discharging the same to the rear platform for arrangement into a proper shaped pile or haycock.

A still further object of the invention is the provision of a machine for gathering hay into haycocks formed with a lifting mechanism having supporting ropes normally sagging between adjacent cleats for receiving the hay from a hay rake or gatherer and discharging the same at a given point.

In the accompanying drawings:

Figure 1 is a side view of a machine disclosing an embodiment of the invention.

Fig. 2 is a top plan view of the structure shown in Fig. 1.

Fig. 3 is a section through Fig. 2 on line 3—3.

Fig. 4 is a plan view of a machine similar to Fig. 2, but with the hoods and top removed.

Fig. 5 is a detail fragmentary sectional view through a rake and associate mechanism embodying features of the invention, same being taken approximately on line 5—5 of Fig. 6.

Fig. 6 is a section through Fig. 5 on line 6—6.

Fig. 7 is a detail fragmentary sectional view through Fig. 4 on line 7—7, showing the pawl and ratchet connection between the mechanism and the traction wheel.

In making hay it is necessary to first cut the grass and leave it on the ground until it has become cured, after which it must be gathered and placed under cover or arranged in stacks of any desired size. Where these stacks are comparatively large they are commonly known as haystacks, where if they are small they are commonly known as haycocks. The arrangement of the hay in this manner causes the rain to merely come in contact with the outer surface and thereby protect the principal part of the hay. Different ways have been used heretofore in providing these haycocks as for instance by raking the hay in windrows and then gathering them into piles, after which the hay is arranged into a cock. Other devices have been provided wherein the hay is gathered up and discharged on wagons or other vehicles for transportation to a haystack, barn or other destination. The present invention is arranged with certain parts so related as to gather up the hay after it has been cured, lift the hay to a given point, and then discharge the same to a rear platform provided with limiting side members where an operator may arrange the hay into a proper cock of a desired size, after which the operator may force the cock from the platform to the ground.

Referring to the accompanying drawings by numerals 1 indicates the base or bottom frame to which the vertical frame 2 is secured in any suitable manner and also an inclined frame 3, which is connected at its upper end with the frame 2 whereby ample framework is provided for supporting the various members hereinafter described. The frame 1 has an axle 4' connected thereto, said axle being provided with a pair of traction wheels 4, one of which carries a gear wheel 5 meshing with the gear wheel 6. The gear wheel 6 is supported by a stub shaft 7, said shaft being in turn supported on the frame 1 in any suitable manner. Gear wheel 6 has a sprocket wheel 8 connected therewith which accommodates sprocket chain 46 whereby power is transmitted to the moving parts of the device. In order to connect the traction wheel 4 with the gear wheel 5 the gear is provided with a pawl 10 pivotally mounted at 10' on the gear wheel by suitable stub shaft. This pawl is designed to engage the ratchet member 11 rigidly secured to the hub of wheel 4 in any suitable manner, said ratchet wheel being preferably constructed with a plurality of widely separated lugs 11', said lugs being comparatively large so as to withstand considerable strain. Normally the pawl 10 is held in engagement with one of the lugs 11' by a spring 58 which is rigidly secured at one end of the pawl, but is provided with a bent end section 59 normally resting on the lug 60 whereby pawl 10 is held in position as shown in Fig. 7. When it is desired to disconnect the wheel 4 from the moving parts of the device pawl 10 is manually raised and moved pivotally and spring 58 is moved until the bent section 59 is beneath the lug 60 whereupon the pawl 10 will be positively held out of engagement and the device may be moved across the field, or wherever desired without any of the moving parts being actuated. When the parts are in operative position as shown in Fig. 7 and the entire device moved backwardly the pawl 10 will automatically slide over the lug 11' without becoming displaced and will automatically again engage one of the lugs when the device is moved forwardly.

Arranged on the frame 1 is an elevator 12, and connected to frame 1 at the rear is a platform 13, said platform being hinged at 14 and 15 to the frame 1, so that the platform may move up and down independently as it passes over the ground. The platform 13 is provided with side members 16 and a pair of board or upright members 17 properly supported for limiting the size of the haycock formed therebetween. A pair of caster wheels 18 are arranged at the rear of the platform 13 so that the platform may properly follow the frame 1, which frame is supported by the wheels 4 and by a front caster 19. Caster 19 is slidingly mounted in the cross bar 20 of the frame 1, which cross bar may be raised and lowered by reason of the sleeve 21 held in place by set screw 22. This being done if adjustment is desirable so as to raise and lower the various tines 23 of the rake 24. The rake 24 is of the rotary type and is provided with end wheels 25 having a plurality of spaced notches 26 for receiving slats 27 as they move. A plurality of bars 28 connect the end wheels 25 together, said bars accommodating the tines 23, which tines are preferably wound around the bars 28 several times as shown in Fig. 5, so as to give the tines an appreciable yielding action. In case any of the tines strike a stone or other immovable object, the tine so engaged will bend back or rather remain stationary as the machine moves forward, and will consequently wind up the windings on the bar 28. After the stone or other object has been passed the tine will quickly move to its correct position and will continue to rotate as intended. As shown in Fig. 3, the tines 23 are provided with depending sections 29 and a rake section 30 arranged at an angle to said depending section 29, said rake section approaching the ground at a substantially vertical position so as to properly rake and then pick up the hay or other matter being harvested. In order that the tines 23 may release the hay as the slats 27 engage the same, as well as the chains 41 and 43 and cables or ropes 32, the rods 28 are rotatably mounted in the wheels, 25, though the center rod or shaft 33 is rigidly secured thereto. Each of the rods 28 carry an extension or crank arm 34 as shown in Figs. 5 and 6, said arms having an end member 35 extending into grooves 36 of the cam 37. Groove 36 is arranged as slightly over a half circle and merges gradually into an almost flat section 38 as shown in Fig. 6, whereby the tines 23 are turned back after having elevated the hay, in order that the tines may pass beneath the hay substantially in a horizontal direction when in their highest position. Shaft 33 is rigidly connected with wheels 25 as above stated and is also rigidly connected to the end wheels 25'. A chain 41, for instance Fig. 4, passes over the end wheel 25 and also over the sprocket wheel 42, while the chain 43 passes over the end wheel 25' and over sprocket wheel 44, said chains being rigidly secured to the slats or cleats 27 whereby they are moved as the tines are moved by the sprocket wheels. A driving sprocket 45 is secured to the shaft 33 at its outer end as shown in Fig. 4, the driving sprocket receiving power from sprocket wheel 8 through chain 46. It will thus be seen that chains 41 and 43 are each a continuous chain and are provided at spaced intervals with cleats 27. From Fig. 3 it will be seen that the sprocket wheels 42 and 44 are supported by a shaft 48 carrying suitable journal members on the upright or vertical frame 2 at an appreciable distance above the platform 13 so that as the hay is passed thereover it can fall on the platform. An idler 49 is provided which causes the chains 41 and 43 to have a short substantially horizontal section 50 whereby any hay adhering to the chains or rods will have time to drop therefrom either in a position on the platform 13 or on to the apron 51 from which it slides by gravity to the platform. Apron 51 is supported in any suitable manner, but is preferably connected to the vertical frame 2 and diagonal frame 3'. In arranging the ropes 32 in the position in which they are secured to the slats 27, they are of such a length as to sag between the various slats even though the chains 41 and 43 are tight. This provides for the proper length of rope for taking up any moisture as for instance when the ropes get wet, and act as additional supports for the hay, so that the hay will not slip off the slats 27.

Arranged above the elevator 12 is a top member 52 provided with a number of slats 53 extending over the transverse member 54 and transverse member 55. Below the member 55 is an arc-shaped hood 56 preferably of sheet metal positioned so as to partially surround the rake and assist the rake in moving the hay to the elevator. A discharge or upper hood 57 is provided partially surrounding the wheels 43 and 44 and associate parts so as to cause a direct downward discharge of the hay and thereby insure the hay striking the platform 23 substantially at the same point continually.

It will, of course, be understood that the entire device may be made any desired width and that any desired number of tines 23 may be used on the rake.

In operation when the parts are arranged as shown in Figs. 1 and 3 the device is drawn across the field by any suitable power means. The height of the rake may be adjusted during the first movement of the machine across the field so as to cause the tines 23 to properly engage and raise the hay to the elevator. It will be observed that the rake rotates in the opposite direction to the rotation of the traction wheel 4 so that the hay is gathered up practically from the position where it fell after being cut, and deposited on the elevator 12 which raises the same to an upward position and finally discharges the hay downwardly and adjacent the hood 57. The hay falling on the platform 13 is moved by one or more workmen on the platform to a position between the boards 17 and arranged in a proper haycock at this point. When a sufficient quantity has been provided and the haycock properly made it is pushed off the platform 13 toward the rear while the machine continues to move forwardly and continually deposits hay in the front of the platform 13. After the first haycock has been discharged the second is begun and so on as long as the device is in use. It will be noted that the device does not gather up the hay and discharge the same in bundles, but gathers up the hay and deposits same on the platform where the hay is arranged properly and discharged as a completed, finished haycock capable of withstanding ordinary weather.

What I claim is:

A hay cocking platform adapted to be attached to the rear end of a hay gathering apparatus for receiving the hay therefrom, said platform being formed with a space for receiving hay from the hay gathering apparatus, a space for receiving the hay cock and a pair of spaces for receiving workmen, a pair of up-standing partition members arranged in spaced parallel relation to provide walls on each side of the cock receiving space, said partition members extending from the rear edge of the platform but falling short of the front end to leave said hay receiving space clear, and traction members arranged at the rear of the platform.

JOHN A. FRANCE.